United States Patent
Kuriyagawa et al.

(10) Patent No.: US 12,029,155 B2
(45) Date of Patent: Jul. 9, 2024

(54) WORKING MACHINE HAVING MULTIPLE MODES OF OPERATION

(71) Applicant: HONDA MOTOR CO., LTD., Tokyo (JP)

(72) Inventors: Koji Kuriyagawa, Wako (JP); Shunichiro Sueyoshi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 686 days.

(21) Appl. No.: 17/177,340

(22) Filed: Feb. 17, 2021

(65) Prior Publication Data
US 2021/0161064 A1    Jun. 3, 2021

Related U.S. Application Data

(63) Continuation of application No. PCT/JP2018/031395, filed on Aug. 24, 2018.

(51) Int. Cl.
*A01D 34/00* (2006.01)
*A01D 34/68* (2006.01)
(Continued)

(52) U.S. Cl.
CPC ....... *A01D 34/006* (2013.01); *A01D 34/6806* (2013.01); *A01D 34/78* (2013.01); *A01D 2101/00* (2013.01)

(58) Field of Classification Search
CPC .. A01D 34/6086; A01D 34/006; A01D 34/78; A01D 34/37; A01D 34/58; A01D 34/6812; A01D 34/6818; A01D 2034/6843
See application file for complete search history.

(56) References Cited

U.S. PATENT DOCUMENTS 5,606,851 A * 3/1997 Bruener ............... A01D 34/74
56/10.8
8,098,036 B2   1/2012 Matsunaga et al.
(Continued)

FOREIGN PATENT DOCUMENTS

EP   2111735 A1 * 10/2009 ............. A01D 34/37
EP   2237344 A1   10/2010
(Continued)

OTHER PUBLICATIONS

International Search Report and Written Opinion for PCT/JP2018/031395 dated Nov. 20, 2018.
(Continued)

*Primary Examiner* — Adam J Behrens
*Assistant Examiner* — Ashley A Kaercher
(74) *Attorney, Agent, or Firm* — Thomas| Horstemeyer, LLP (57) ABSTRACT

A working machine with a working unit is configured to perform a work, comprising a battery and a control unit, wherein the control unit has, as operation modes, a normal mode in which the working unit is operable based on power of the battery, and a power saving mode in which the working unit is made inoperable by limiting some of functions, as compared with the normal mode, and power consumption of the battery is suppressed, as compared with the normal mode, thereby, it is possible to improve the usability of the working machine and to appropriately prevent the battery down of a working machine.

9 Claims, 6 Drawing Sheets

US 12,029,155 B2

Page 2

(51) Int. Cl.
*A01D 34/78* (2006.01)
*A01D 101/00* (2006.01)

(56) References Cited

U.S. PATENT DOCUMENTS

| | | | |
|---|---|---|---|
| 8,350,512 | B2 | 1/2013 | Matsunaga et al. |
| 9,127,658 | B2 | 9/2015 | Koenen et al. |
| 9,467,084 | B2 | 10/2016 | Suzuki et al. |
| 2003/0222607 | A1* | 12/2003 | Simizu ............... B60L 50/52 318/139 |
| 2006/0021312 | A1* | 2/2006 | Brandon ............. A01D 34/006 56/10.2 R |
| 2010/0001675 | A1 | 1/2010 | Matsunaga et al. |
| 2010/0253271 | A1* | 10/2010 | Godbold ............. B60L 50/61 318/459 |
| 2012/0079799 | A1 | 4/2012 | Matsunaga et al. |
| 2012/0227369 | A1* | 9/2012 | Koike ................. B60L 1/003 318/474 |
| 2014/0150390 | A1* | 6/2014 | Schygge ............. A01D 34/006 701/50 |
| 2014/0165525 | A1 | 6/2014 | Nagata |
| 2014/0292245 | A1 | 10/2014 | Suzuki et al. |
| 2017/0057040 | A1 | 3/2017 | Rzasa et al. |
| 2023/0059942 | A1* | 2/2023 | Ro ....................... A01D 34/78 |

FOREIGN PATENT DOCUMENTS

| | | | | |
|---|---|---|---|---|
| EP | 3120684 | A1 * | 1/2017 | |
| EP | 3120684 | A1 | 1/2017 | |
| EP | 3326443 | A1 * | 5/2018 | ........... A01D 34/006 |
| JP | 2010-158743 | A | 7/2010 | |
| JP | 5463014 | B2 | 4/2014 | |
| JP | 2014-188662 | A | 10/2014 | |
| JP | 5616868 | B2 | 10/2014 | |
| JP | 2015-008665 | A | 1/2015 | |
| JP | 6085469 | B2 | 2/2017 | |
| TW | 200414868 | A * | 8/2004 | ............ A01D 34/58 |
| WO | WO-0186798 | A1 * | 11/2001 | ........... A01D 34/006 |
| WO | 2020/039582 | A1 | 2/2020 | |

OTHER PUBLICATIONS

Extended European Search Report for European Patent Application 18931130.1 dated Jul. 9, 2021.

* cited by examiner

WORKING MACHINE HAVING MULTIPLE MODES OF OPERATION

CROSS-REFERENCE TO RELATED APPLICATION(S)

This application claims priority to and the benefit of PCT/JP2018/031395 filed on Aug. 24, 2018, the entire disclosure of which is incorporated herein by reference.

TECHNICAL FIELD

The present invention relates to a working machine that performs a work mainly based on power of a battery.

BACKGROUND ART

Some of working machines include a batter such as a lithium ion battery (see PTL 1). Since a user may not use a working machine for a relatively long period, a battery down may occur. Therefore, the user may not be able to use the working machine at a desired timing. As a measure against the battery down, it is considered to detach the battery in advance from the working machine. However, it is often complicated for the user to attach/detach the battery, which may increase the load on the user.

CITATION LIST

Patent Literature

PTL 1: U.S. Pat. No. 9,127,658

SUMMARY OF INVENTION

Technical Problem

The object of the present invention can relatively easily prevent a battery down of a working machine while improving the usability of the working machine.

Solution to Problem

The first aspect of the present invention is related to a working machine, and the working machine is a working machine with a working unit configured to perform a work, comprising a battery and a control unit, wherein the control unit has, as operation modes, a normal mode in which the working unit is operable based on power of the battery, and a power saving mode in which the working unit is made inoperable by limiting some of functions, as compared with the normal mode, and power consumption of the battery is suppressed, as compared with the normal mode.

Advantageous Effects of Invention

According to the present invention, it is possible to appropriately prevent the battery down of a working machine.

DESCRIPTION OF EMBODIMENTS

Embodiments of the present invention will now be described with reference to the accompanying drawings. Note that the drawings are schematic views showing a structure or an arrangement according to the embodiment, and the dimensions of members shown in the drawings do not necessarily reflect real dimensions. The same reference numerals denote the same elements in the drawing, and a description of repetitive contents will be omitted in this specification.

Figure 1:
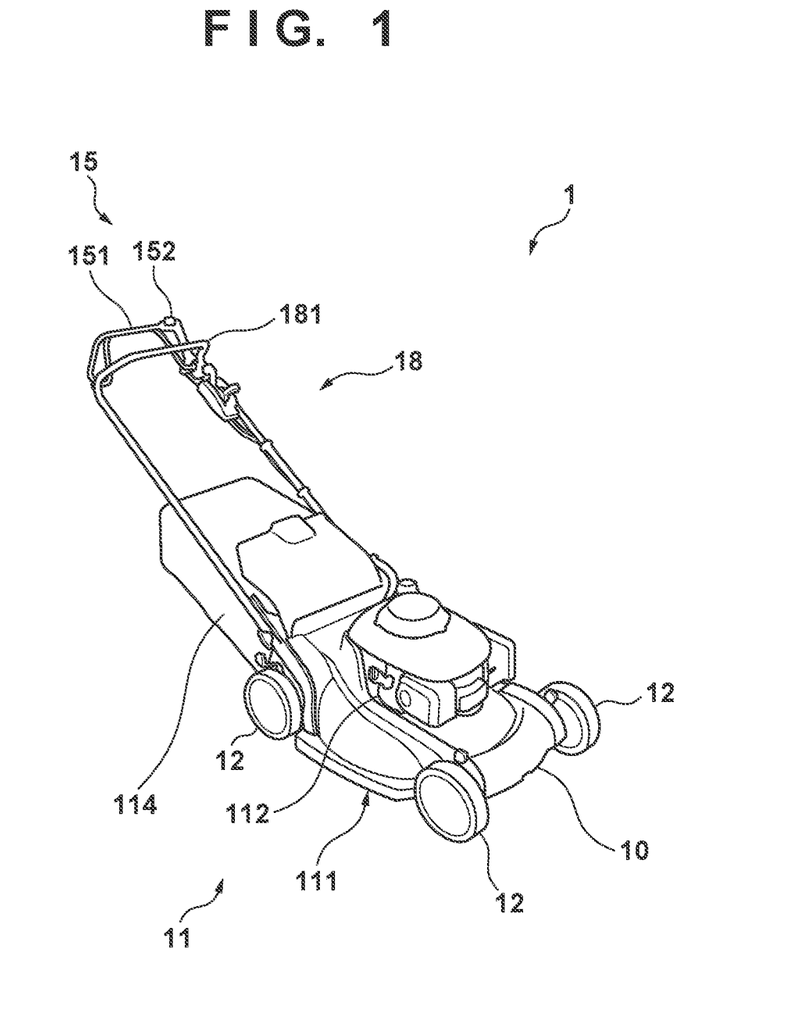
FIG. 1 is a perspective view for explaining an example of the arrangement of a working machine.
Figure 2:
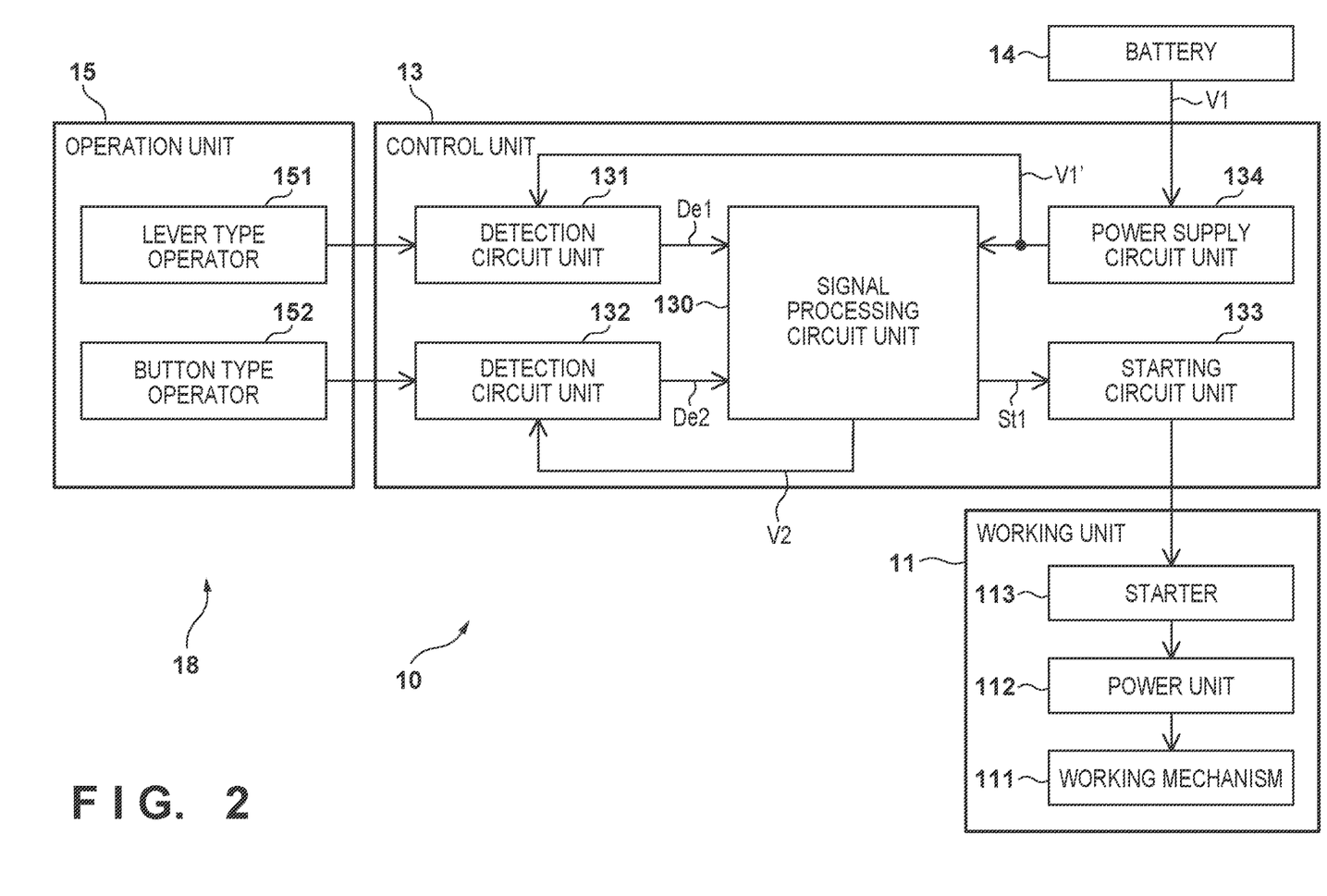
FIG. 2 is a block diagram for explaining an example of the arrangement of the working machine.

FIG. 1 is a perspective view of a working machine 1 according to an embodiment. FIG. 2 is a block diagram showing an example of the arrangement of the working machine 1. The working machine 1 includes a working unit 11, a traveling unit 12, a control unit 13, and a battery 14 in a main body portion 10. The working machine 1 further includes an operation unit 15 in an extended portion 18 extended from the main body portion 10 to the rear and upper sides.

In this embodiment, the working unit 11 includes a working mechanism 111, a power unit 112, a starter 113, and a grass bag 114. The working mechanism 111 is a mechanism for implementing a predetermined work. In this embodiment, the working mechanism 111 is a disc-shaped blade (see FIG. 1) rotatably arranged in the lower portion of the main body portion 10, thereby making it possible to perform lawn mowing as an example of a work (the working machine 1 can also be called a lawn mower). In this embodiment, the power unit 112 is an internal combustion engine (engine), which serves as a power source that generates power (rotation) to drive the working mechanism 111 (see FIG. 2). A transmission such as HST (Hydro-Static Transmission) may be provided as part of the power unit 112/in addition to the power unit 112. The starter 113 starts the power unit 112 in response to a signal from the control unit 13 (to be described later) (see FIG. 2). The grass bag 114 is a storage portion that stores a lawn mowed by the working mechanism 111, and is detachably arranged in the rear portion of the main body portion 10 (see FIG. 1). With this arrangement, the working unit 11 can execute a work in a predetermined work region.

The traveling unit 12 includes a pair of front wheels and a pair of rear wheels each rotatably arranged in the lower portion of the main body portion 10, thereby supporting the main body portion 10 (see FIG. 1). The traveling unit 12 can make the working machine 1 travel by receiving power from the power unit 112. An end portion of the extended portion 18 is formed as a grip portion (handle bar) 181 like a bar (see FIG. 1), and the user can perform a work while pushing the working machine 1 by gripping the grip portion 181. The working machine 1 can also be called a walking type working machine, a walking type lawn mower, or the like.

The operation unit 15 accepts, from the user, an input operation of controlling the operating state of the working unit 11. The operation unit 15 is provided at a position where the user readily operates it. In this embodiment, the operation unit 15 includes a lever type operator 151 and a button type operator 152, both of which are arranged in the extended portion 18, particularly, in the grip portion 181 or its periphery (see FIG. 1). In this embodiment, the lever type operator 151 is pivotably juxtaposed with the bar-like grip portion 181. The user inputs an operation by making the lever type operator 151 pivot. In this embodiment, the button type operator 152 is a push button type switch of an automatic return type arranged in one end portion of the grip portion 181. The user inputs an operation by pressing the button type operator 152. Note that the input operation to the operation unit 15 by the user is transmitted as an electrical signal to the control unit 13 (to be described later) via a cable, a wire, or the like.

Although details will be described later, this embodiment assumes that the working unit 11 is set in the operating state when the user operates the button type operator 152 while operating the lever type operator 151. That is, even if the user presses the button type operator 152 without making the lever type operator 151 pivot, the working unit 11 is not set in the operating state. The operation form in which the user operates the button type operator 152 while operating the lever type operator 151 is also called a two-step operation or the like, and is advantageous in ensuring safety when operating the working unit 11.

After the working unit 11 is set in the operating state, the user can perform a work using the working unit 11 in the operating state by making the working machine 1 travel while maintaining the lever type operator 151 in an operated state (a state in which the lever type operator 151 is made to pivot). Furthermore, the user can set the working unit 11 in a stop state at a desired timing by releasing the operation of the lever type operator 151 (for example, by releasing the hand from the lever type operator 151). In this embodiment, assume that in the stop state of the working unit 11, the power unit 112 is in a stop state and the working mechanism 111 is also in a stop state.

As another embodiment, the working mechanism 111 and the power unit 112 can mechanically be coupled by a clutch, and coupling/releasing of the clutch may be controllable by the lever type operator 151. For example, the clutch is set in a coupled state by operating the lever type operator 151, and is set in a released state by releasing the operation. In this case, in accordance with releasing of the operation of the lever type operator 151, transmission of power of the power unit 112 to the working mechanism 111 can be interrupted without stopping the power unit 112.

The operation unit 15 can further include another operator. Examples of the other operator are an operator for adjusting the height of the disc-shaped blade as the working mechanism 111, an operator for changing the output level of the power unit 112, and an operator for breaking the traveling unit 12.

The control unit (control apparatus) 13 is an electric component that receives power from the battery 14, and performs control of each element of the working machine 1, for example, driving control of the working unit 11 based on the input operation to the operation unit 15 by the user. The control unit 13 can include, for example, a wiring portion for implementing electrical connection between the elements in addition to one or more mount substrates on which electronic components are implemented. Examples of the electronic components are semiconductor devices such as an ASIC (Application Specific Integrated Circuit) and PLD (Programmable Logic Device). Examples of the wiring portion are a wire harness, FPC (Flexible Printed Circuit), and CoF (Chip on Film).

Although details will be described later, in this embodiment, the control unit 13 includes a signal processing circuit unit 130, detection circuit units 131 and 132, a starting circuit unit 133, and a power supply circuit unit 134 (see FIG. 2). Note that in this specification, a circuit unit indicates an element to which one or more passive elements or active elements are electrically connected to be able to implement a predetermined function. Thus, each circuit unit may be separated into some parts and provided or may be provided close to another circuit unit.

The signal processing circuit unit 130 is an MCU (Micro Controller Unit) or MPU (Micro Processing Unit) that performs signal processing for system control of the overall working machine 1 based on the power of the battery 14. As the signal processing circuit unit 130, for example, a predetermined battery management IC (Integrated Circuit) such as RAJ240100 (Renesas Electronics) can be used.

As the detection circuit unit 131, one or more input circuit ICs that make it possible to detect an operation input to the lever type operator 151 can be used. The detection circuit unit 131 supplies, using a voltage V1', an electrical signal, indicating that an operation has been input to the lever type operator 151, as a detection signal De1 to the signal processing circuit unit 130.

As the detection circuit unit 132, one or more input circuit ICs that make it possible to detect an operation input to the button type operator 152 can be used. The detection circuit unit 132 supplies, using a voltage V2 different from the voltage V1', an electrical signal, indicating that an operation has been input to the button type operator 152, as a detection signal De2 to the signal processing circuit unit 130.

In response to the reception of the detection signals De1 and De2, the signal processing circuit unit 130 outputs a start signal St1 to the starting circuit unit 133, thereby making the power unit 112 start using the starter 113. The power of the power unit 112 is transmitted to the working mechanism 111, and the working mechanism 111 is set in a driving state, that is, the working unit 11 is set in the operating state.

As the power supply circuit unit 134, a power supply IC including a DC-DC converter can be used. The power supply circuit unit 134 generates one or more power supply voltages based on a voltage V1 of the battery 14, and supplies them to the signal processing circuit unit 130. For example, the power supply circuit unit 134 is configured to supply the voltage V1' to the detection circuit unit 131. The voltage V1' may be equal to the voltage V1 or may have a different value. In this embodiment, assume that while the remaining amount of the battery 14 is sufficient, the voltage V1' is continuously supplied to the detection circuit unit 131. Note that if the voltage V1' is equal to the voltage V1, the voltage V1 may be supplied directly from the battery 14 to the detection circuit unit 131. To simplify the description, a representation "voltage (power supply voltage)" has been used. However, a representation "power" may be used in consideration of a current component such as a driving current.

Assume that the signal processing circuit unit 130 incorporates a regulator, can generate the voltage V2 based on the voltage V1', and can supply power P2 to the detection circuit unit 132. In other words, the detection circuit unit 132 is arranged electrically independent of the detection circuit unit 131. Although details will be described later, the control unit 13 has a normal mode and a power saving mode as operation modes. In the normal mode, the voltage V2 is supplied to the detection circuit unit 132. In the power saving mode, supply of the voltage V2 to the detection circuit unit 132 is suppressed.

As the battery 14, a chargeable secondary battery such as a lithium ion battery or nickel hydrogen battery can be used. Although a detailed description will be omitted in this specification, the control unit 13 can also charge the battery 14 using power generated by regenerative braking of the power unit 112.

Figure 3:
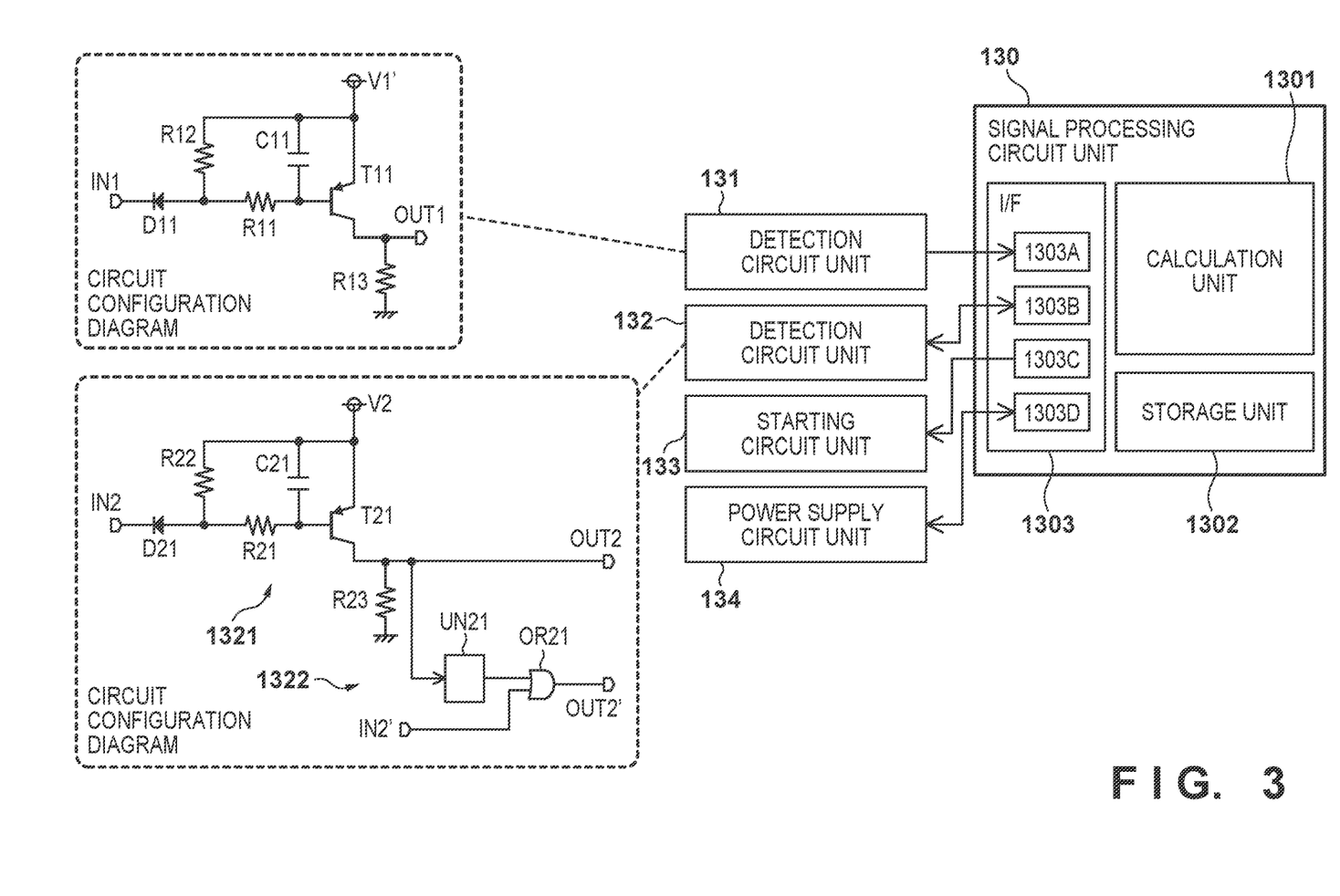
FIG. 3 is a block diagram for explaining an example of the arrangement of a control unit.

FIG. 3 is a block diagram showing details of the arrangement of the control unit 13. The signal processing circuit unit 130 includes a calculation unit 1301, a storage unit 1302, and an interface unit 1303. The calculation unit 1301 and the storage unit 1302 perform signal processing based on a predetermined program. The interface unit 1303 includes a plurality of portions corresponding to a plurality of elements that exchange a signal or voltage with the signal processing circuit unit 130, and in this embodiment, includes portions 1303A to 1303D. The portion 1303A receives, as an input to the signal processing circuit unit 130, the signal De1 from the detection circuit unit 131. The portion 1303B outputs the voltage V2 to the detection circuit unit 132, and receives, as an input to the signal processing circuit unit 130, the signal De2 from the detection circuit unit 132. The portion 1303C outputs the signal SU to the starting circuit unit 133. The portion 1303D receives, as an input to the signal processing circuit unit 130, the voltage V1 from the power supply circuit unit 134.

The detection circuit unit 131 includes an input terminal IN1, an output terminal OUT1, a rectifier element D11, a transistor T11, resistance elements R11, R12, and R13, and a capacitor C11. The input terminal IN1 is connected to the cathode of the rectifier element D11. In this embodiment, as the transistor T11, a PNP type bipolar transistor is used. The emitter of the transistor T11 is connected to the voltage V1', and the collector of the transistor T11 is connected to the output terminal OUT1. One end of the resistance element R11 is connected to the anode of the rectifier element D11, and the other end of the resistance element R11 is connected to the base of the transistor T11. One end of the resistance element R12 is connected to the anode of the rectifier element D11, and the other end of the resistance element R12 is connected to the voltage V1'. One end of the resistance element R13 is connected to the output terminal OUT1, and the other end of the resistance element R13 is grounded. One end of the capacitor C11 is connected to the voltage V1', and the other end of the capacitor C11 is connected to the base of the transistor T11.

With this arrangement, the detection circuit unit 131 outputs, using the voltage V1', the detection signal De1 indicating that an operation has been input to the lever type operator 151. The signal processing circuit unit 130 receives the detection signal De1 by the portion 1303A of the interface unit 1303.

The detection circuit unit 132 includes input terminals IN2 and IN2', output terminals OUT2 and OUT2', a rectifier element D21, a transistor T21, resistance elements R21, R22, and R23, a capacitor C21, a starting circuit unit UN21, and an OR circuit unit OR21. In the detection circuit unit 132, the voltage V2 is used instead of the voltage V1'.

The input terminal IN2, the output terminal OUT2, the rectifier element D21, the transistor T21, the resistance elements R21, R22, and R23, and the capacitor C21 are integrated as a normal input circuit unit 1321, and are arranged in the same arrangement as that of the detection circuit unit 131. That is, the input terminal IN2, the output terminal OUT2, the rectifier element D21, the transistor T21, the resistance elements R21, R22, and R23, and the capacitor C21 correspond to the input terminal IN1, the output terminal OUT1, the rectifier element D11, the transistor T11, the resistance elements R11, R12, and R13, and the capacitor C11, respectively.

With this arrangement, the detection circuit unit 132 outputs, using the voltage V2, the detection signal De2 indicating that an operation has been input to the button type operator 152. The signal processing circuit unit 130 receives the detection signal De2 by the portion 1303B of the interface unit 1303.

The input terminal INT, the output terminal OUT2', the starting circuit unit UN21, and the OR circuit unit OR21 are integrated as a temporary input circuit unit 1322, which is arranged in parallel with the normal input circuit unit 1321. The input terminal of the starting circuit unit UN21 is connected to the output terminal OUT2, and the output terminal of the starting circuit unit UN21 is connected to one input terminal of the OR circuit unit OR21. The input terminal INT is an electrode electrically connectable to an external power supply (a power supply different from the battery 14), as needed, and is connected to the other input terminal of the OR circuit unit OR21. The output terminal OUT2' is connected to the output terminal of the OR circuit unit OR21. This makes it possible to supply, using the external power supply (without using the battery 14), to the signal processing circuit unit 130, the detection signal indicating that the operation has been input to the button type operator 152.

By individually providing the voltage V1' of the detection circuit unit 131 and the voltage V2 of the detection circuit unit 132, the working unit 11 can be operated under a condition under which each voltage is supplied. This is equivalent to making it possible to start a work when all the individual circuit units can operate normally, and it is thus possible to improve safety when the working machine 1 is used with the relatively simple arrangement.

Figure 4:
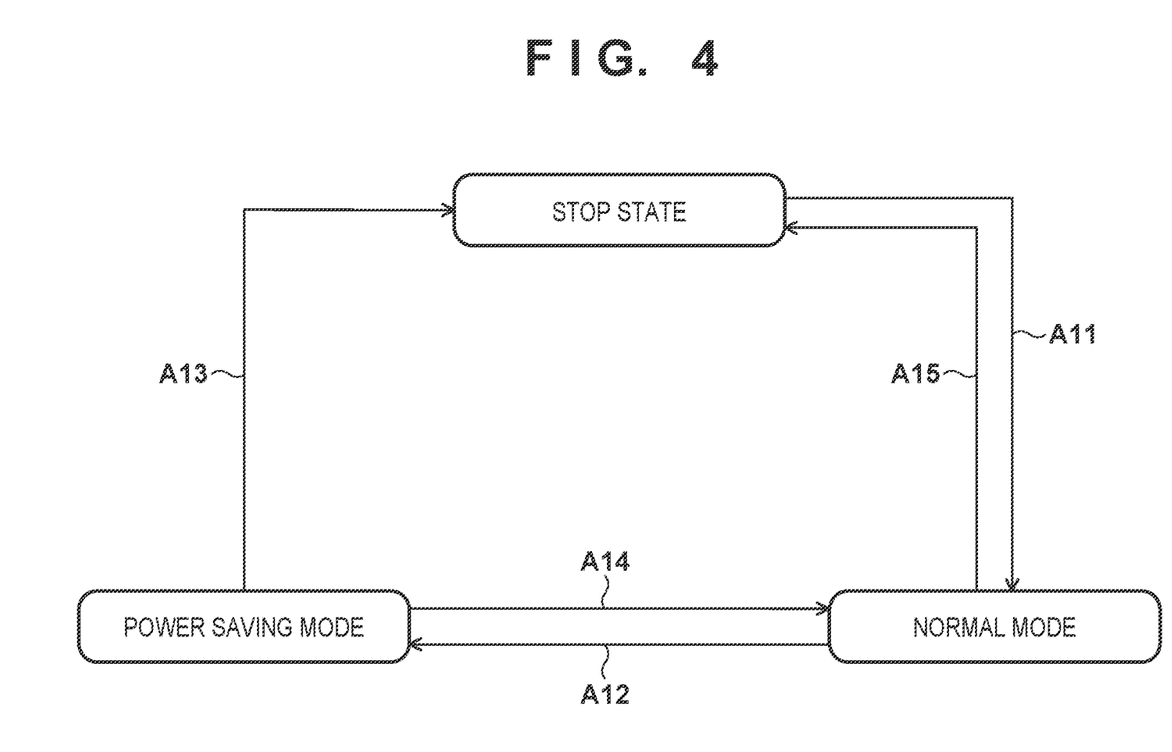
FIG. 4 is a view for explaining an example of the operation mode of the control unit.

FIG. 4 is a state transition diagram concerning the control unit 13. The control unit 13 is set in the operating state based on power from the battery 14, and has, as the operation modes, the normal mode and the power saving mode. The normal mode is a mode in which the working unit 11 is operable based on the power of the battery 14. The power saving mode in a mode in which some of the functions of the control unit 13 are limited, as compared with the normal mode, and thus the working unit 11 is made inoperable and the power consumption of the battery 14 is suppressed, as compared with the normal mode.

The limitation of some functions of the control unit 13 in the power saving mode can be implemented by setting, to an inactive state, an element in the control unit 13 associated with the operation of the working unit 11, for example, by suppressing supply of the power supply voltage to the element or limiting a bias current in the element. In the power saving mode according to this embodiment, supply of the voltage V2 to the detection circuit unit 132 is suppressed, generation of the voltage V2 in the signal processing circuit unit 130 is suppressed, and supply of the power supply voltage to the portions 1303B and 1303C of the interface unit 1303 is suppressed. Calculation processing by the calculation unit 1301 and its associated readout/write from/in the storage unit 1302 are not performed. Therefore, according to this embodiment, the maximum consumed current amount of the control unit 13 is about 5 [mA] in the normal mode but is about 50 [μA] in the power saving mode.

In a predetermined case, for example, a case in which power from the battery 14 is substantially zero/is not sufficient, the control unit 13 is in the stop state as a state in which all the functions are limited. The stop state is a state in which the system of the control unit 13 is down and a state in which the control unit 13 has substantially no power consumption (has a maximum consumed current amount less than 1 [μA]. Note that in correspondence with the stop state, the normal mode may be called an active state or the like, and the power saving mode may be called a partially active state, a sleep state, or the like.

In this embodiment, the control unit 13 in the stop state shifts to the normal mode when a condition A11 is satisfied. As an example of the condition A11, (i) in a state in which the remaining amount of the battery 14 is larger than a reference value, (ii) a state in which the lever type operator 151 is operated is set. When the control unit 13 is set in the normal mode, the signal processing circuit unit 130 generates the voltage V2, and supplies it to the detection circuit unit 132. This allows the detection circuit unit 132 to detect an input operation to the button type operator 152 by the user. When the user operates the button type operator 152, the control unit 13 sets the working unit 11 in the operating state.

Furthermore, the control unit 13 in the normal mode shifts to the power saving mode when a condition A12 is satisfied. As an example of the condition A12, (i) in a state in which the remaining amount of the battery 14 is larger than the reference value, (ii) a state in which the operation of the lever type operator 151 is released is set. When the control unit 13 is set in the power saving mode, the signal processing circuit unit 130 suppresses supply of the voltage V2 to the detection circuit unit 132. This disables the detection circuit unit 132 from detecting the input operation to the button type operator 152 by the user.

Furthermore, the control unit 13 in the power saving mode is set in the stop state when a condition A13 is satisfied. As an example of the condition A13, (i) the remaining amount of the battery 14 is or becomes smaller than the reference value.

Furthermore, the control unit 13 in the power saving mode shifts to the normal mode when a condition A14 is satisfied. As an example of the condition A14, (i) in a state in which the remaining amount of the battery 14 is larger than the reference value, (ii) a state in which the lever type operator 151 is operated is set.

Furthermore, the control unit 13 in the normal mode is set in the stop state when a condition A15 is satisfied. As an example of the condition A15, (i) the remaining amount of the battery 14 is or becomes smaller than the reference value.

Figure 5A:
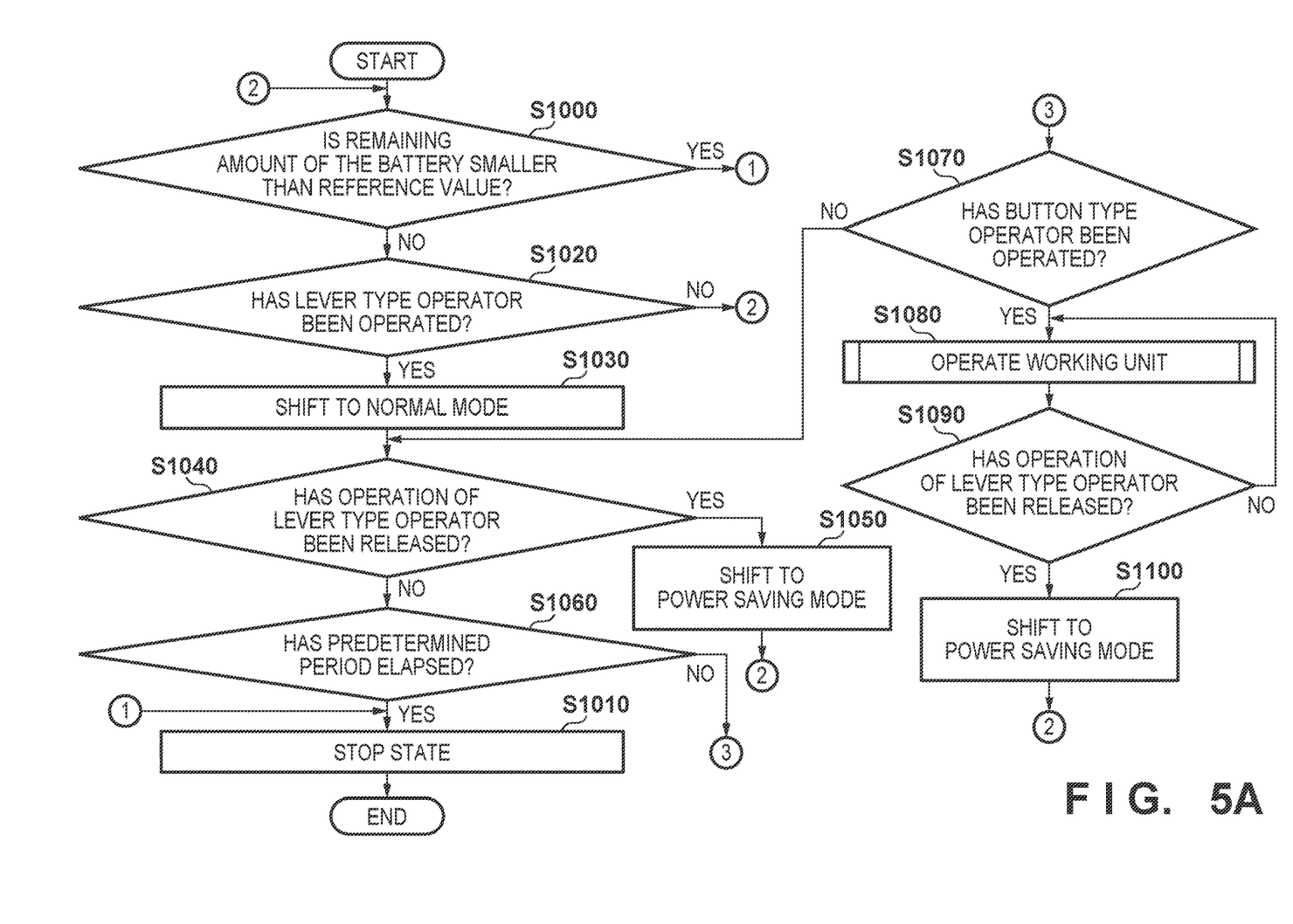
FIG. 5A is a flowchart for explaining an example of a control form by the control unit.

FIG. 5A is a flowchart for explaining the control form of the control unit 13 based on the input operation to the operation unit 15 by the user. When the user attempts to use the working machine 1 (before the lever type operator 151 is operated), the control unit 13 is generally in the state of the power saving mode or the stop state. For example, if the remaining amount of the battery 14 is sufficient (larger than the reference value), the control unit 13 is in the power saving mode. Note that the remaining amount of the fuel (gasoline) of the power unit 112 is sufficient, and thus the user can perform a necessary work sufficiently after setting the working unit 11 in the operating state by operating the operation unit 15.

In step S1000 (to be simply referred to as "S1000" hereinafter) (the same applies to other steps), it is determined whether the remaining amount of the battery 14 is smaller than the reference value. For example, the power supply circuit unit 134 can evaluate the remaining amount of the battery 14, and the control unit 13 can perform the determination processing based on a signal of the power supply circuit unit 134 indicating the evaluation result. If the remaining amount of the battery 14 is smaller than the reference value, the process advances to S1010; otherwise, the process advances to S1020. In S1010, the control unit 13 is set in the stop state by making the system of the control unit 13 down, thereby ending this flowchart.

In S1020, it is determined whether the lever type operator 151 has been operated. If the lever type operator 151 has been operated, that is, the signal processing circuit unit 130 receives the detection signal De1 from the detection circuit unit 131, the process advances to S1030; otherwise, the process returns to S1000.

In S1030, the control unit 13 shifts to the normal mode. In S1020, the control unit 13 is often in the power saving mode. However, the control unit 13 is in the stop state, for example, immediately after the battery 14 is replaced. In this case, in S1030, the control unit 13 shifts from the stop state to the normal mode.

In S1040, it is determined whether the operation of the lever type operator 151 has been released, that tis, whether the lever type operator 151 operated in S1020 has been returned to an original state. If the operation of the lever type operator 151 has been released, the process advances to S1050; otherwise, the process advances to S1060. In S1050, the control unit 13 shifts to the power saving mode, and the process returns to S1000.

In S1060, it is determined whether a predetermined period has elapsed since the operation of the lever type operator 151. For example, the signal processing circuit unit 130 incorporates a counter (measurement unit) that measures an elapsed time since reception of the detection signal De1, and the control unit 13 can perform the determination processing based on the measurement result. If the predetermined period has elapsed, the process advances to S1010; otherwise, the process advances to S1070.

As a case in which the process advances from S1060 to S1010, a case is considered in which a state in which the lever type operator 151 is operated is fixed due to an unexpected reason such as a wrong use form by the user. In this case, the control unit 13 remains in the normal mode, and the power of the battery 14 is wastefully consumed, causing the battery down. To cope with this, if the predetermined period has elapsed since the operation of the lever type operator 151, the control unit 13 is set in the stop state, thereby appropriately preventing the battery down.

In S1070, it is determined whether the button type operator 152 has been operated. If the button type operator 152 has been operated, that is, the signal processing circuit unit 130 receives the detection signal De2 from the detection circuit unit 132, the process advances to S1080; otherwise, the process returns to S1040.

In S1080, the working unit 11 is set in the operating state. That is, the signal processing circuit unit 130 outputs the start signal St1 to the starting circuit unit 133, and starts the power unit 112 using the starter 113 (see FIG. 2).

Figure 5B:
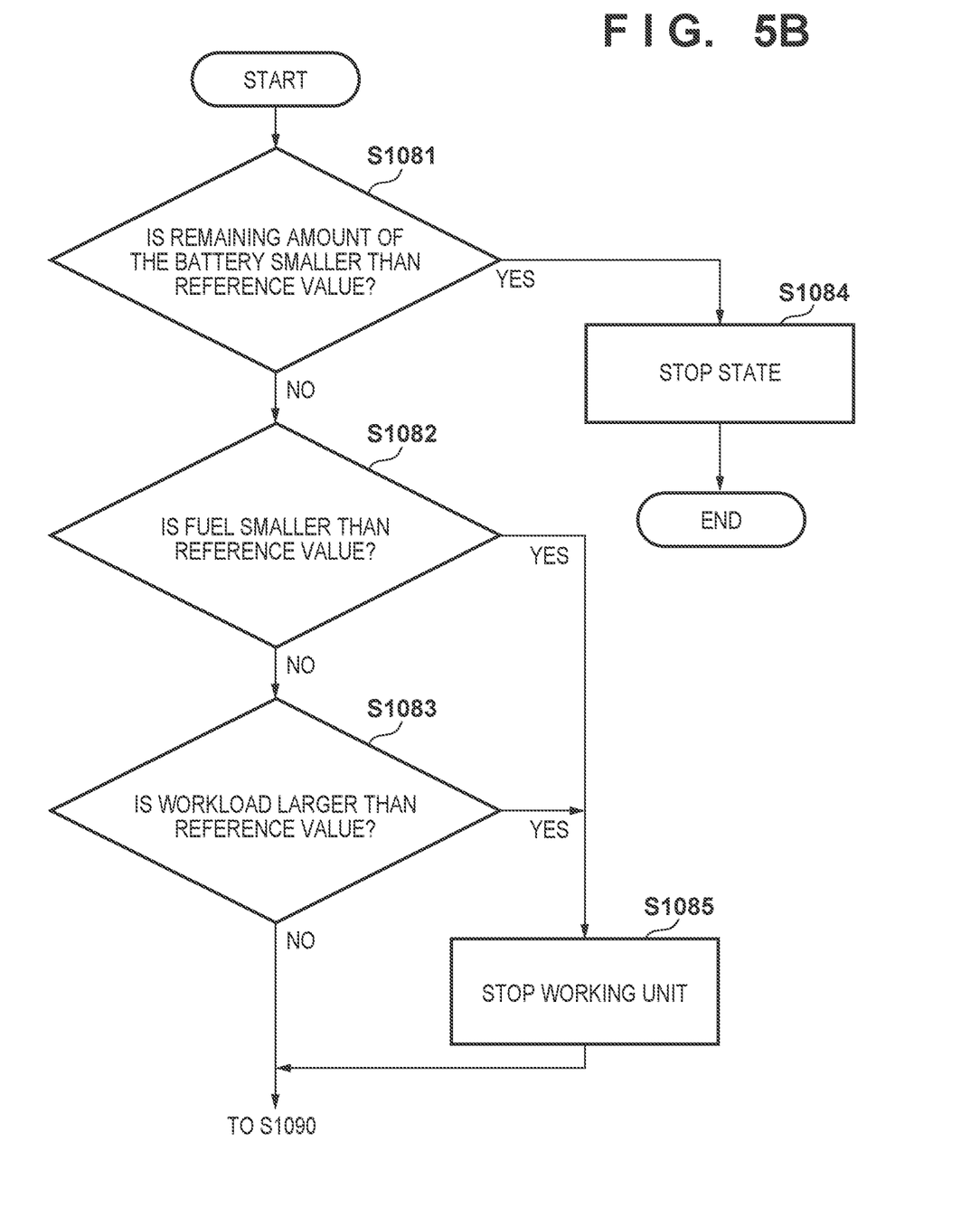
FIG. 5B is a flowchart for explaining an example of the control form by the control unit.

FIG. 5B is a flowchart for explaining the operating state of the working unit 11 as an example of contents in S1080 above. In S1081, it is determined whether the remaining amount of the battery 14 is smaller than the reference value. If the remaining amount of the battery 14 is smaller than the reference value, the process advances to S1084; otherwise, the process advances to S1082. Note that S1081 can be implemented in the same procedure as in S1000.

In S1082, it is determined whether the remaining amount of the fuel of the power unit 112 is smaller than the reference value. If the remaining amount of the fuel is smaller than the reference value (in general, the fuel is used up), it is determined that a work cannot be continued and the process advances to S1085; otherwise, the process advances to S1083.

In S1083, it is determined whether the work load of the working unit 11 is larger than a reference value. If the work load of the working unit 11 is larger than the reference value, it is determined that the work cannot be continued and the process advances to S1085; otherwise, the process advances to S1090. Note that examples of a condition for determining that the work load of the working unit 11 is larger than the reference value are generation of torque equal to or higher than an allowable value in the power unit 112, and the amount of lawn (mowed lawn) in the grass bag 114 becoming equal to or larger than an allowable amount.

Since it is determined in S1081 that the remaining amount of the battery 14 is smaller than the reference value, the control unit 13 is set in the stop state in S1084 as in S1010, thereby ending this flowchart.

Since it is determined in S1082 or S1083 that the work cannot be continued, in S1085 the working unit 11 is stopped, that is, the power unit 112 is stopped to stop the working mechanism 111. Note that the lever type operator 151 remains in the operated state at this time, and thus the control unit 13 remains in the normal mode.

In S1090, it is determined whether the operation of the lever type operator 151 has been released. If the operation of the lever type operator 151 has been released, the process advances to S1100; otherwise, the process returns to S1080. In S1100, the control unit 13 shifts to the power saving mode, and then the process returns to S1000. For example, if the operation of the lever type operator 151 is released while the working unit 11 is operated, the control unit 13 stops the working unit 11 while shifting to the power saving mode. For example, if the operation of the lever type operator 151 is released after the working unit 11 is stopped in S1085, the control unit 13 shifts to the power saving mode in response to the releasing of the operation.

Summarizing the above flowcharts, the user can start a work safely by performing a two-step operation of operating the button type operator 152 while operating the lever type operator 151. The operation mode (normal mode/power saving mode) of the control unit 13 is switched by an input operation to the lever type operator 151 as the first step of the two-step operation. That is, the control unit 13 shifts to the normal mode when the lever type operator 151 is operated, thereby setting a state in which the control unit 13 stands by for an input operation to the button type operator 152 as the second step, that is, a state in which preparation for the operation of the working unit 11 is complete. Furthermore, the control unit 13 shifts to the power saving mode when the operation of the lever type operator 151 is released, thereby making it possible to relatively easily (with a relatively small number of operations) suppress the power consumption of the battery 14 by the control unit 13. After the start of the work, the user can end/abort the work by releasing the operation of the lever type operator 151 as necessary/in accordance with completion of the work. In this case as well, it is possible to relatively easily make the control unit 13 shift to the power saving mode.

In general, the working machine is often used in a season in which a lawn grows easily, and the use frequency can vary depending on, for example, the season. Therefore, the working machine may be stored in a storage and may not be used for a relatively long period. In this case, the battery down of the working machine may occur.

The working machine 1 according to this embodiment includes the control unit 13 having, as the operation modes, the normal mode and the power saving mode. The normal mode is a mode in which the working unit 11 is operable based on power of the battery 14. The power saving mode is a mode in which some functions are limited, as compared with the normal mode, to make the working unit 11 inoperable and the power consumption of the battery 14 is suppressed, as compared with the normal mode. According to this embodiment, if the working machine 1 is not used for a relatively long period, it is possible to appropriately prevent the battery down by setting the control unit 13 in the power saving mode. Furthermore, even if it is expected not to use the working machine 1 for a relatively long period, the user is not forced to detach the battery 14, and thus the usability of the working machine 1 is also improved.

According to this embodiment, since the operation mode of the control unit 13 is switched based on an input operation to the operation unit 15 by the user for controlling operating state of the working unit 11, it is unnecessary to newly provide a dedicated operation unit for switching the operation mode. Therefore, according to this embodiment, the battery down can be prevented with a relatively simple arrangement. In this embodiment, the operation unit 15 includes the lever type operator 151 and the button type operator 152, and the user can set the working unit 11 in the operating state by operating the button type operator 152 while operating the lever type operator 151. This two-step operation allows the user to start a work safely, and it is also possible to prevent the battery down relatively easily.

According to this embodiment, since the operation of the second step of the two-step operation cannot be detected unless the operation of the first step is performed, safety of control by the control unit 13 can be improved. The control unit 13 is applicable to various applications in which the two-step operation is preferable, and the control target is not limited to the constituent components of the working machine 1.

The present invention is not limited to some examples described above and contents of the embodiment may partially be modified without departing from the scope of the invention. In addition, individual terms described in this specification are merely used for the purpose of explaining the present invention, and the present invention is not limited to the strict meanings of the terms, as a matter of course, and can also incorporate their equivalents. For example, the embodiment has explained, as a preferable example of the working machine 1, a lawn mower that performs lawn mowing. However, an outline of the working machine 1 includes various working vehicles, and can include, for example, a snowplow that performs snow removing as a work as well as an agricultural working machine such as a cultivator.

The features of the above-described embodiment will be summarized below.

The first aspect is related to a working machine (for example 1), and the working machine is a working machine with a working unit (for example, 11) configured to perform a work, comprising a battery (for example, 14) and a control unit (for example, 13), wherein the control unit has, as operation modes, a normal mode in which the working unit is operable based on power of the battery, and a power saving mode in which the working unit is made inoperable by limiting some of functions, as compared with the normal mode, and power consumption of the battery is suppressed, as compared with the normal mode.

According to the first aspect, it is possible to appropriately prevent a battery down that can be caused when the working machine has not been used for a relatively long period. In addition, since it is unnecessary to detach the battery, it is possible to improve the usability of the working machine.

In the second aspect, the working machine further comprises an operation unit (for example, 15) configured to accept an operation of controlling an operating state of the working unit, wherein the control unit changes the operation mode based on the operation input to the operation unit.

According to the second aspect, since it is possible to switch the operation mode by an operation performed when operating the working unit, it is unnecessary to newly provide a dedicated operation unit for switching the operation mode. Therefore, the battery down can be prevented with a relatively simple arrangement.

In the third aspect, the operation unit includes a first operator (for example, 151) and a second operator (for example, 152), and the working unit is set in the operating state when a user operates the second operator while operating the first operator.

According to the third aspect, since the working unit can be set in the operating state by, for example, pressing a button type operator as the second operator while pulling a lever type operator as the first operator (by a so-called two-step operation), it is possible to start the work safely while improving the usability.

In the fourth aspect, the working machine further comprises a main body portion (for example, 10) to which the working unit is attached, and an extended portion (for example, 18) extended from the main body portion to a rear side and an upper side to be grippable by the user, wherein both the first operator and the second operator are provided in the extended portion.

According to the fourth aspect, since the first and second operators are provided at positions where the user readily operates them, it is possible to further improve the usability.

In the fifth aspect, when the user releases the operation of the first operator, the control unit is set in the power saving mode.

According to the fifth aspect, since the control unit is set in the power saving mode when releasing the operation of the first step of the two-step operation, it is possible to prevent the battery down relatively easily (with a relatively small number of operations).

In the sixth aspect, when a remaining amount of the battery becomes smaller than a reference value, the control unit is set in a stop state in which all the functions are limited.

According to the sixth aspect, a state in which the control unit has substantially no power consumption is set by limiting all the functions of the control unit (by making the system of the control unit down).

In the seventh aspect, if the user has not operated the second operator for a predetermined period in a state in which the first operator is operated, the control unit is set in the stop state.

According to the seventh aspect, it is possible to prevent the control unit from being maintained in the normal mode due to a wrong use form or the like. Note that a value (for example, several tens of sec to several min or more) sufficiently larger than a time generally required to perform the two-step operation is set as the predetermined period.

In the eighth aspect, when the user operates the first operator, the control unit is set in the normal mode.

According to the eighth aspect, the control unit can be set in the normal mode relatively easily by performing the operation of the first step of the two-step operation, thereby completing preparation for the operation of the working unit. Note that a case in which the control unit is set in the normal mode includes a case in which the control unit shifts from the power saving mode to the normal mode, and a case in which the control unit returns from the stop mode to the normal mode. In the latter case, a signal indicating that the operation of the first step has been performed acts as a signal indicating a return instruction to the control unit.

In the ninth aspect, the control unit includes a first detection circuit unit (for example, 131) configured to detect, using a first voltage (for example, V1'), an operation input to the first operator, and a second detection circuit unit (for example, 132) arranged electrically independent of the first detection circuit unit, and configured to detect, using a second voltage (for example, V2) different from the first voltage, an operation input to the second operator.

According to the ninth aspect, since the working unit is operable under a condition under which each of the first and second voltages is supplied, it is possible to improve safety when used with the relatively simple arrangement.

In the 10th aspect, the control unit further includes a signal processing circuit unit (for example, 130) configured to perform predetermined signal processing by receiving, from the first detection circuit unit and the second detection circuit unit, detection signals (for example, De1, De2) indicating that the operations have been input to the first operator and the second operator, respectively, and the signal processing circuit unit generates the second voltage using the first voltage, and supplies the second voltage to the second detection circuit unit.

According to the 10th aspect, it is possible to appropriately implement the ninth aspect.

In the 11th aspect, the first voltage is a voltage of the battery.

According to the 11th aspect, it is possible to appropriately implement the ninth aspect.

In the 12th aspect, the working unit includes a working mechanism (for example, 111) configured to execute the work, and a power unit (for example, 112) configured to generate power to be supplied to the working mechanism.

According to the 12th aspect, each of the above-described aspects can preferably be applied to the working machine including the working mechanism and the power unit configured to supply power to the working mechanism.

In the 13th aspect, when the user operates the first operator, the control unit is set in the normal mode and can detect the operation input to the second operator, when the user operates the second operator while operating the first operator, the control unit sets the working unit in the operating state, and when the user releases the operation of the first operator, the control unit stops the working unit and is set in the power saving mode.

According to the 13th aspect, it is possible to implement both switching of the operation mode and the operation of the working unit in the two-step operation, and also set the control unit in the power saving mode relatively easily when the work ends or is aborted.

In the 14th aspect, the working machine is a walking type working machine (for example, 1).

According to the 14th aspect, each of the above-described aspects can be applied to a known walking type working machine appropriately.

The 15th aspect is related to a control apparatus (for example, 13), and the control apparatus is a control apparatus for controlling a control target (for example, 11) by receiving a first voltage (for example, V1') from a battery (for example, 14), comprising a first detection circuit unit (for example, 131) configured to output a first detection signal (for example, De1) using the first voltage, a second detection circuit unit (for example, 132) configured to output a second detection signal (for example, De2) using a second voltage (for example, V2) different from the first voltage, and a signal processing circuit unit (for example, 130) configured to perform signal processing of controlling the control target based on the first detection signal and the second detection signal, wherein a normal mode and a power saving mode in which power consumption of the battery is suppressed, as compared with the normal mode are included as operation modes, and the signal processing circuit unit generates, in the normal mode, the second voltage based on the first voltage and supplies the second voltage to the second detection circuit unit, and suppresses the supply in the power saving mode.

According to the 15th aspect, since, in the embodiment, the operation of the second step of the two-step operation cannot be detected unless the operation of the first step is performed, safety of control can be improved. The control apparatus is usable in various applications in which the two-step operation is preferable. For example, the control apparatus may be used to control an industrial robot, a manipulator, and the like for the purpose of, for example, improvement of safety.

The present invention is not limited to the above embodiments and various changes and modifications can be made within the spirit and scope of the present invention. Therefore, to apprise the public of the scope of the present invention, the following claims are made.

The invention claimed is:

1. A working machine with a working unit configured to perform a work, comprising:
   a battery;
   a control unit; and
   an operation unit configured to accept an operation of controlling an operating state of the working unit, the operation unit including a first operator and a second operator,
   wherein the working unit is set in the operating state when a user operates the second operator while operating the first operator,
   the control unit has, as operation modes,
   a normal mode in which the working unit is operable based on power of the battery, and
   a power saving mode in which the working unit is made inoperable by limiting some of functions of the control unit, as compared with the normal mode, and power consumption of the battery is suppressed, as compared with the normal mode,
   the control unit further has a stop state in which all functions of the control unit are limited,
   the control unit is set in the normal mode when the user operates the first operator, and is set in the power saving mode when the user releases the operation of the first operator, and
   the control unit enters the stop state
      in a case where, in the normal mode, a remaining amount of the battery becomes smaller than a reference value,
      in a case where, in the normal mode, the user has not operated the second operator for a predetermined period in a state that the first operator is operated, or
      in a case where, in the power saving mode, the remaining amount of the battery becomes smaller than the reference value.

2. The working machine according to claim 1, wherein the control unit changes the operation mode based on an operation input to the operation unit.

3. The working machine according to claim 1, further comprising:
   a main body portion to which the working unit is attached; and
   an extended portion extended from the main body portion to a rear side and an upper side to be grippable by the user,
   wherein both the first operator and the second operator are provided in the extended portion.

4. The working machine according to claim 1, wherein the control unit includes
   a first detection circuit unit configured to detect, using a first voltage, an operation input to the first operator, and
   a second detection circuit unit arranged electrically independent of the first detection circuit unit, and configured to detect, using a second voltage different from the first voltage, an operation input to the second operator.

5. The working machine according to claim 4, wherein the control unit further includes a signal processing circuit unit configured to perform predetermined signal processing by receiving, from the first detection circuit unit and the second detection circuit unit, detection signals indicating that the operations have been input to the first operator and the second operator, respectively, and
   the signal processing circuit unit generates the second voltage using the first voltage, and supplies the second voltage to the second detection circuit unit.

6. The working machine according to claim 4, wherein the first voltage is a voltage of the battery.

7. The working machine according to claim 1, wherein the working unit includes
   a working mechanism configured to execute the work, and
   a power unit configured to generate power to be supplied to the working mechanism.

8. The working machine according to claim 1, wherein
   when the user operates the first operator, the control unit is set in the normal mode and can detect an operation input to the second operator,
   when the user operates the second operator while operating the first operator, the control unit sets the working unit in the operating state, and
   when the user releases the operation of the first operator, the control unit stops the working unit and is set in the power saving mode.

9. The working machine according to claim 1, wherein the working machine is a walking type working machine.

* * * * *